(12) United States Patent
Zecheru

(10) Patent No.: US 12,534,233 B2
(45) Date of Patent: Jan. 27, 2026

(54) AIRFOIL PROFILE FOR AN AIRCRAFT AND AERODYNAMIC SURFACES USING SAID AIRFOIL PROFILE

(71) Applicant: Airbus Operations GmbH, Hamburg (DE)

(72) Inventor: Mihai Ioan Zecheru, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 174 days.

(21) Appl. No.: 18/489,411

(22) Filed: Oct. 18, 2023

(65) Prior Publication Data

US 2024/0132236 A1 Apr. 25, 2024
US 2024/0228073 A9 Jul. 11, 2024

(30) Foreign Application Priority Data

Oct. 20, 2022 (EP) .................................... 22202663

(51) Int. Cl.
*B64C 3/14* (2006.01)
*B64C 11/20* (2006.01)
*B64U 20/20* (2023.01)
*B64U 10/25* (2023.01)

(52) U.S. Cl.
CPC ............. *B64U 20/20* (2023.01); *B64C 3/14* (2013.01); *B64C 11/20* (2013.01); *B64U 10/25* (2023.01)

(58) Field of Classification Search
CPC .......... B64U 20/20; B64U 30/10; B64C 3/14; B64C 11/18; B64C 3/36
See application file for complete search history.

(56) References Cited

U.S. PATENT DOCUMENTS

| | | | |
|---|---|---|---|
| 3,822,105 A | | 7/1974 | Jepson |
| 4,072,282 A | * | 2/1978 | Fulker ....................... B64C 3/14 244/35 R |
| 4,641,796 A | * | 2/1987 | Feifel ........................ B64C 3/14 244/123.7 |
| 5,314,142 A | * | 5/1994 | Rao ............................ B64C 3/14 244/204 |
| 6,382,921 B1 | * | 5/2002 | Selig ..................... F04D 29/384 416/243 |

(Continued)

FOREIGN PATENT DOCUMENTS

CN 118665747 A * 9/2024 ............... B64C 3/36

OTHER PUBLICATIONS https://www.nasa.gov/wp-content/uploads/2015/05/hallion.pdf (Year: 2015).*

(Continued)

*Primary Examiner* — Brian M O'Hara
(74) *Attorney, Agent, or Firm* — Greer, Burns & Crain, Ltd.

(57) ABSTRACT

An airfoil profile for an aircraft, such as an unmanned aerial system. The airfoil profile includes a leading edge portion and a trailing edge portion that are spaced apart along a chordwise direction, an airfoil centroid; and an upper airfoil surface and a lower airfoil surface. The airfoil surfaces are shaped such that the pressure center of the lifting force is arranged at the same chord location as the airfoil centroid or closer to the trailing edge portion along the chordwise direction than the airfoil centroid. With this, a pitch-down momentum is generated that urges the leading edge portion towards a lower angle of attack.

17 Claims, 4 Drawing Sheets

(56) References Cited

U.S. PATENT DOCUMENTS

| | | | | |
|---|---|---|---|---|
| 6,607,164 | B2* | 8/2003 | Somers | B64C 3/14 244/35 R |
| 7,093,792 | B2* | 8/2006 | Fujino | B64C 3/14 244/35 R |
| 7,992,827 | B2* | 8/2011 | Shepshelovich | B64C 9/18 244/35 R |
| 8,186,616 | B2* | 5/2012 | Shepshelovich | B64C 3/14 244/45 R |
| 9,487,286 | B2* | 11/2016 | Simon | B64C 3/14 |
| 10,933,970 | B2* | 3/2021 | Harrison | B64C 3/16 |
| 11,873,075 | B2* | 1/2024 | Van Treuren | B64C 27/467 |
| 12,358,606 | B1* | 7/2025 | Qasem | B64C 3/16 |
| 2021/0039767 | A1* | 2/2021 | Paruchuri | B64C 3/14 |
| 2024/0059407 | A1* | 2/2024 | Kasap | B64C 27/06 |

OTHER PUBLICATIONS

GOE 431 shape plot, https://bigfoil.com/S/bcd4e5f8-8d48-4e2a-b0c3-7819ba6e2c39_infoS1.php (Year: 1912).*

European Search Report for corresponding European Patent Application No. 22202663 dated Jun. 23, 2023; priority document.

UIUC Applied Aerodynamics Group—Department pf Aerospace Engineering—University of Illinois at Urbana—Champaign: "UIUC Airfoil Coordinates Database—Goe 8k entry" retrieved from the Internet: https://web.archive.org/web/20150604012958/http://m-selig.ae/illinois.edu/ads/coord/goe08k.dat on Jun. 22, 2023.

J. Watkinson, "The Art of the Helicopter" Elsevier, Oxford, Dec. 31, 2004.

* cited by examiner

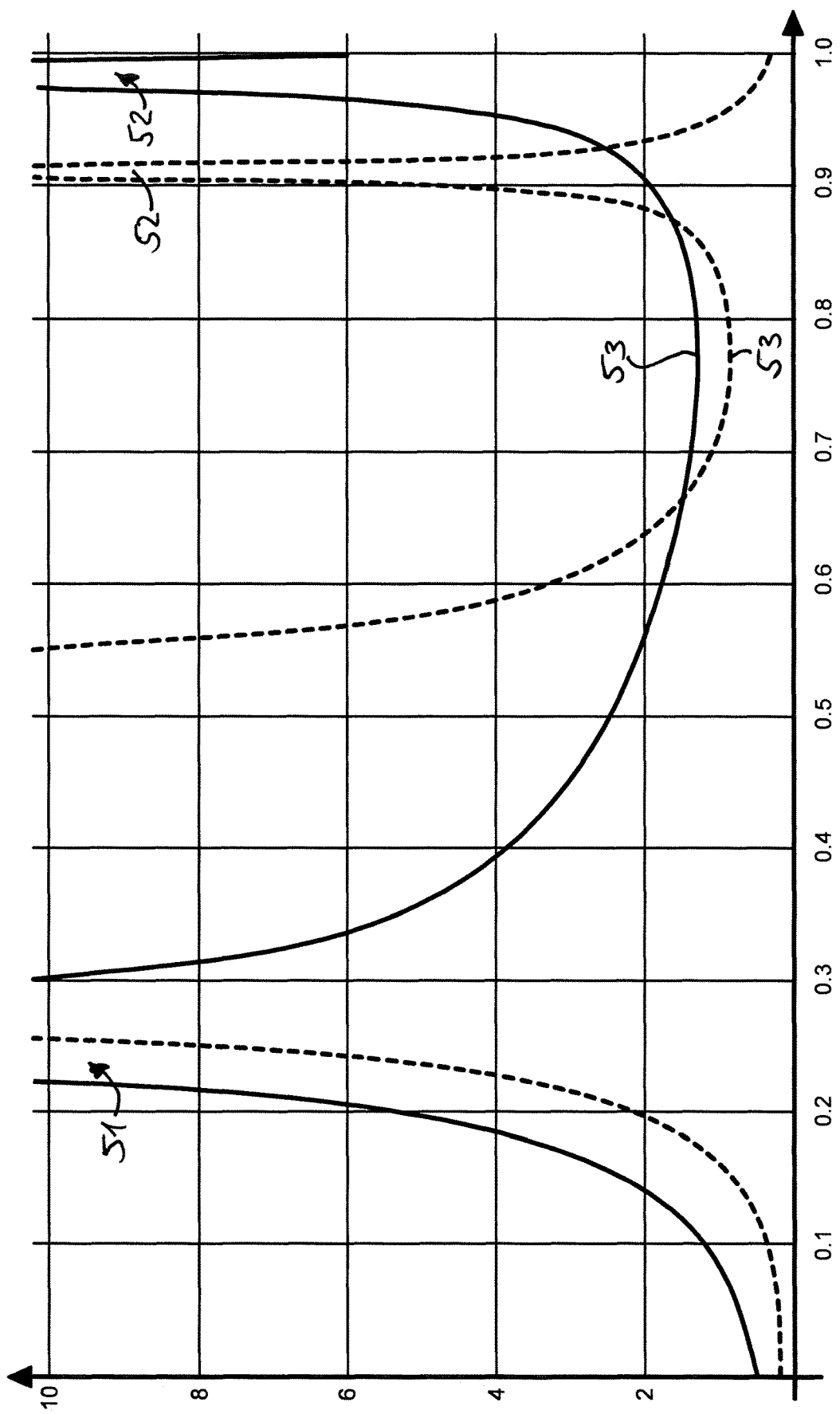

AIRFOIL PROFILE FOR AN AIRCRAFT AND AERODYNAMIC SURFACES USING SAID AIRFOIL PROFILE

CROSS-REFERENCES TO RELATED APPLICATIONS

This application claims the benefit of the European patent application No. 22 202 663.5 filed on Oct. 20, 2022, the entire disclosures of which are incorporated herein by way of reference.

FIELD OF THE INVENTION

The invention relates to an airfoil profile. The invention further relates to a wing or propeller blade having such an airfoil profile. The invention further relates to an aircraft equipped with said wing or propeller blade.

BACKGROUND OF THE INVENTION

The development of modern aircraft, such as drones (Unmanned Aerial Vehicles) or aerial mobility concepts, are increasingly concentrating on environmental impact. A key factor for their acceptance to the wide masses of publicum and certification requirements is to keep the noise level as low as possible. When it gets to EASA noise level requirements reference is made to ICAO Annex 16, Volume I. Every National Aviation Authority is issuing noise level standards using EASA Form 45 (for aircraft—fixed wing and rotorcrafts). There are many ways to reduce the noise produced by the aircraft but not all are suitable to be implemented in UAVs. An important source of noise are the propulsion elements and the propeller(s). A variable pitch propeller is typically used on civil and military aviation. However, for drones this is not always feasible due to weight limitation.

SUMMARY OF THE INVENTION

It is an object of the invention to reduce noise emanating from an airfoil.

The invention provides an airfoil profile for an aircraft, such as an unmanned aerial system, the airfoil profile being configured for reducing a noise level, the airfoil profile comprising:
  a leading edge portion and a trailing edge portion that are spaced apart along a chordwise direction;
  an airfoil centroid that is arranged from 40% to 60% of a chord length along the chordwise direction; and
  an upper airfoil surface and a lower airfoil surface that are shaped so as to generate a lifting force in a manner such that a pressure center of the lifting force is arranged at the same chord location as the airfoil centroid or closer to the trailing edge portion along the chordwise direction than the airfoil centroid.

Preferably, the airfoil centroid is arranged from 43% to 55%, preferably from 45% to 54%, of the chord length along the chordwise direction.

Preferably, the upper and lower airfoil surfaces are shaped such that the pressure center of the lifting force is arranged from 40% to 60%, preferably from 43% to 55%, more preferably from 45% to 54%, of the chord length along the chordwise direction.

Preferably, the upper airfoil surface comprises a first upper curved portion that is arranged between the leading edge portion and the airfoil centroid along the chordwise direction, preferably from 20% to 30% of the chord length, more preferably from 20% to 25% of the chord length, more preferably from 21% to 23% of the chord length.

Preferably, the first upper curved portion has a maximum modulus of the radius of curvature from 1.8 times to 4.4 times the chord length, wherein preferably the maximum modulus of the radius of curvature continuously decreases from an airfoil outward portion towards an airfoil inward portion along a spanwise direction.

Preferably, the location of the first upper curved portion along the chordwise direction is measured from the location of the maximum modulus of the radius of curvature.

Preferably, the spatial extension of the first upper curved portion along the chordwise direction is measured as the full-width at half-maximum (FWHM) of the radius of curvature.

Preferably, the spatial extension of the first upper curved portion along the chordwise direction is from 15 percentage points to 22 percentage points.

Preferably, the spatial extension of the first upper curved portion along the chordwise direction continuously increases from an airfoil outward portion towards an airfoil inward portion along a spanwise direction.

Preferably, the upper airfoil surface comprises a second upper curved portion that is arranged between the airfoil centroid and the trailing edge portion along the chordwise direction, preferably from 75% to 85% of the chord length, more preferably from 78% to 82% of the chord length, more preferably from 79% to 80% of the chord length.

Preferably, the location of the second upper curved portion along the chordwise direction is measured from the location of the maximum modulus of the radius of curvature.

Preferably, the spatial extension of the second upper curved portion along the chordwise direction is measured as the full-width at half-maximum (FWHM) of the radius of curvature.

Preferably, the spatial extension of the second upper curved portion along the chordwise direction is from 19 percentage points to 26 percentage points.

Preferably, the spatial extension of the second upper curved portion along the chordwise direction continuously decreases from an airfoil outward portion towards an airfoil inward portion along a spanwise direction.

Preferably, the second upper curved portion has a maximum modulus of the radius of curvature from 1.9 times to 2.1 times the chord length, wherein preferably the maximum modulus of the radius of curvature continuously increases from an airfoil outward portion towards an airfoil inward portion along a spanwise direction.

Preferably, the upper airfoil surface comprises a third upper curved portion that is arranged between the leading edge portion and the trailing edge portion along the chordwise direction, preferably from 45% to 55% of the chord length, more preferably from 49% to 53% of the chord length, more preferably from 50% to 52% of the chord length.

Preferably, the location of the third upper curved portion along the chordwise direction is measured from the location of the minimum modulus of the radius of curvature.

Preferably, the spatial extension of the third upper curved portion along the chordwise direction is measured as the full-width at double-minimum (FWDM) of the radius of curvature.

Preferably, the spatial extension of the third upper curved portion along the chordwise direction is from 36 percentage points to 40 percentage points.

Preferably, the spatial extension of the third upper curved portion along the chordwise direction continuously decreases from an airfoil outward portion towards an airfoil inward portion along a spanwise direction.

Preferably, the third upper curved portion has a minimum modulus of the radius of curvature from 0.5 times to 0.8 times the chord length, wherein preferably the minimum modulus of the radius of curvature continuously decreases from an airfoil outward portion towards an airfoil inward portion along a spanwise direction.

Preferably, the lower airfoil surface comprises a first lower flat portion that is arranged between the leading edge portion and the airfoil centroid along the chordwise direction, preferably from 25% to 30% of the chord length, more preferably from 25% to 29% of the chord length, more preferably from 25.5% to 28.8% of the chord length.

Preferably the first lower flat portion has a maximum modulus of the radius of curvature above 10 times the chord length.

Preferably, the location of the first lower flat portion along the chordwise direction is measured from location of a first zero crossing of a second derivative of the lower airfoil surface that is closest to the leading edge portion.

Preferably, the spatial extension of the first lower flat portion along the chordwise direction is measured as the full-width at the radius of curvature being 10 times the chord length.

Preferably, the spatial extension of the first lower flat portion along the chordwise direction is from 8 percentage points to 30 percentage points.

Preferably, the spatial extension of the first lower flat portion along the chordwise direction continuously increases from an airfoil outward portion towards an airfoil inward portion along a spanwise direction.

Preferably, the lower airfoil surface comprises a second lower flat portion that is arranged between the leading edge portion and the trailing edge portion along the chordwise direction, preferably from 35% to 55% of the chord length, more preferably from 36% to 52% of the chord length.

Preferably, the location of the second lower flat portion along the chordwise direction is measured from the location a second zero crossing of a second derivative of the lower airfoil surface that is closest to the trailing edge portion.

Preferably, the spatial extension of the second lower flat portion along the chordwise direction is measured as the full-width at the radius of curvature being 10 times the chord length.

Preferably, the spatial extension of the second upper curved portion along the chordwise direction is from 1 percentage points to 3 percentage points.

Preferably, the spatial extension of the second lower flat portion along the chordwise direction continuously decreases from an airfoil outward portion towards an airfoil inward portion along a spanwise direction.

Preferably, the lower airfoil surface comprises a lower curved portion that is arranged between the airfoil centroid and the trailing edge portion along the chordwise direction, preferably from 70% to 80% of the chord length, more preferably from 75% to 79% of the chord length, more preferably from 77% to 78% of the chord length.

Preferably, the location of the lower curved portion along the chordwise direction is measured from the location of the minimum modulus of the radius of curvature.

Preferably, the spatial extension of the lower curved portion along the chordwise direction is measured as the full-width at double-minimum (FWDM) of the radius of curvature.

Preferably, the spatial extension of the lower curved portion along the chordwise direction is from 23 percentage points to 45 percentage points.

Preferably, the spatial extension of the lower curved portion along the chordwise direction continuously decreases from an airfoil outward portion towards an airfoil inward portion along a spanwise direction.

Preferably, the lower curved portion has a minimum modulus of the radius of curvature from 0.85 times to 1.35 times the chord length, wherein preferably the minimum modulus of the radius of curvature continuously decreases from an airfoil outward portion towards an airfoil inward portion along a spanwise direction.

The invention provides a wing or a propeller blade for an aircraft comprising a preferred airfoil profile.

The invention provides a propeller for an aircraft comprising a hub and at least one preferred propeller blade that is supported by the hub.

The invention provides an aircraft, preferably an unmanned aerial system, comprising a preferred wing, propeller blade and/or propeller.

The invention is based on the idea of a new airfoil type that is able—due to its form—to twist a wing or propeller blade in such a way that no mechanism for varying the pitch is necessary. A prerequisite may include an amorph structure of one material or a material that has the same structural characteristics in all directions. The airfoil shape similar to a mammal dolphin body is producing a lift force when inserted in a lifting surface that not only bends but also twists the airfoil under aerodynamic load (similar to aerodynamic tailoring).

In a conventional airfoil, the position of the pressure center (Cp) is around 25% along the chord length from the leading edge. The Cp is the application point of the lift and drag forces generated by the airfoil.

A realistic wing under aerodynamic forces usually exhibits a flow that is not only laminar but includes also areas where turbulence occurs. One source of vortices and pressure drops (potential noise source) are wing/blade tip vortices. Especially for drone propellers which have high rotating speeds (and therefore tip speeds) the vortex distribution can be complex and interactions between those may also produce acoustic vibrations (noise).

In a conventional wing/blade, the leading edge thereof can be bent and twisted under the aerodynamic forces; typically as a pitch-up effect, i.e. the leading edge rises under aerodynamic forces.

The airflow may also have a laminar separation over the top side of the airfoil where subsequently the airflow may then reattach. This is another source of vortices/recirculation and therefore potential noise. After reattaching of the airflow on the top side, at the trailing edge, there is again a potential for separation which again may produce noise effects.

There are technical solutions in wing design and manufacturing to overcome the twisting effect. If the wing is too flexible around its elastic axis, it is able to pitch down and a reversal of the effect on the airflow is that it reattaches over the top side but separates from the bottom side. As a result flutter can occur. For this reason typically the main spars of the structure are preferably positioned either on the elastic axis or behind of it towards trailing edge. Another conventional idea is to use a closed wing structure (wingbox—D-box). For propeller blades a full metal or carbon fiber reinforced plastic (CFRP) structure is used with a closed box.

These known measures, however, are difficult to implement for UASs and may not be effective enough to prevent or reduce the production of noise, if the airflow separates. For UASs, the propeller are usually manufactured from plastic (e.g. by injection molding), CFRP layup or sometimes even wood.

If we take as reference the injection molded propellers they are using laminar airfoils that have a form which not always complies with the noise reduction requirements. Laminar separation bubbles and vortex shedding is the main area of concern since these effects are typically not easily controllable for a wide spectrum of flow velocities. With the flow velocity (rotation and vertical or horizontal) the boundary layer is changing and the vortices production also. That is a noise generation source that should be overcome by the measures presented herein.

The idea is based on a new airfoil type that can overcome the deficiencies by shaping the airfoil in such a way that laminar separation bubbles and premature separation on the trailing edge is reduced, delayed, or even prevented. The airfoil is shaped such that the pressure center (Cp) as the application point for the lifting/normal force is closer towards the trailing edge and the elastic axis is kept forward.

Due to this arrangement, the aerodynamic load generates a torque on the airfoil that causes its leading edge to pitch down (pitch-down effect) around the elastic axis. As a result, the airfoil may operate at a lower angle of attack or keep a quasi-constant operating angle of attack. The bending of the blade/wing will also twist it without any extra means, such as a pitch control mechanism.

To test this effect to a certain extent, simulations on a digital wind tunnel were performed to compare the modification of airfoil on thickness, thickness position and camber. The results of the test are concurrently filed as supplementary material as an appendix to this specification, the disclosures of which is incorporated herein by reference.

The airfoil performance factor—defined as lift coefficient divided by drag coefficient—is used as the key point for comparison.

The position of the Cp at different angles of attack (AoA) in relation to the leading edge was also put in comparison. A digital wind tunnel simulation (XFLRS & JyvaFoil (EPPLER)) shows that at 5° deg AoA the airflow is mainly laminar over the profile. The positive effect is no fluctuation appears and the production of noise is reduced or eliminated.

Analyzing the friction factor coefficient, on a zone A (located at about 10% to 15% of the chord length from the leading edge) the friction factor coefficient goes negative so a small separation may occur, but this was found not to affect the flow over the upper side until very close to the trailing edge. The same area did not show when the simulation was performed with the JavaFoil (EPPLER code).

The zone B (at the trailing edge) separation is normal for every airfoil at Reynolds numbers (Re) below 1 million. Typically, propellers for drones operate at a maximum of Re 500,000.

The shape of the airfoil causes the lift force to apply on the center of pressure so as to create a momentum around the airfoil centroid, i.e., the elastic axis. If this force is acting forward of elastic axis, as is typical in conventional airfoils, a pitch up momentum is generated. Here, especially at a low AoA, e.g., 0.5°, the shape of the airfoil causes the lift force to apply behind the elastic axis, such that a pitch down momentum is produced. Up to an AoA of about 6° the pitch down effect works to reduce the AoA. At about 6° of AoA the lift force applies at the elastic axis thereby causing pure bending of the airfoil without torsion.

The airfoil family used for a propeller blade comprises thickness, thickness position as well as camber modification in the following spectrum: Thickness: 8% to 18%, max. performance Cl/Cd(32 to 70) at AoA 4° to 6°);

Thickness position: 40% to 54%, max. performance Cl/Cd (35 to 75) at AoA 4° to 5°; and Camber: 6% to 10%, max. performance Cl/Cd (55 to 80) at AoA 3° to 5°.

The changes on thickness, thickness position as well as camber does not significantly affect the performance of the airfoil. This is beneficial if the application, as in a propeller blade, needs different thicknesses over the span, i.e., thicker at the root that is supported by the hub and thinner at the blade tip.

The requirement of stability of the maximum performance vs. AoA is even stronger for an application where the incoming airflow is varying through different flight phases. For example, for a drone in the VTOL and start phase, the incident flow has a low incidence up to negative angles. In contrast to a conventional mechanical pitch adaption, the airfoil disclosed herein is capable of pitching the blade by varying the rotational speed of the propeller.

BRIEF DESCRIPTION OF THE DRAWINGS

Embodiments of the invention are described in more detail with reference to the accompanying schematic drawings that are listed below

FIG. 4 depicts a diagram of the radius of curvature of a lower airfoil surface.

DETAILED DESCRIPTION OF THE PREFERRED EMBODIMENTS

Figure 1:
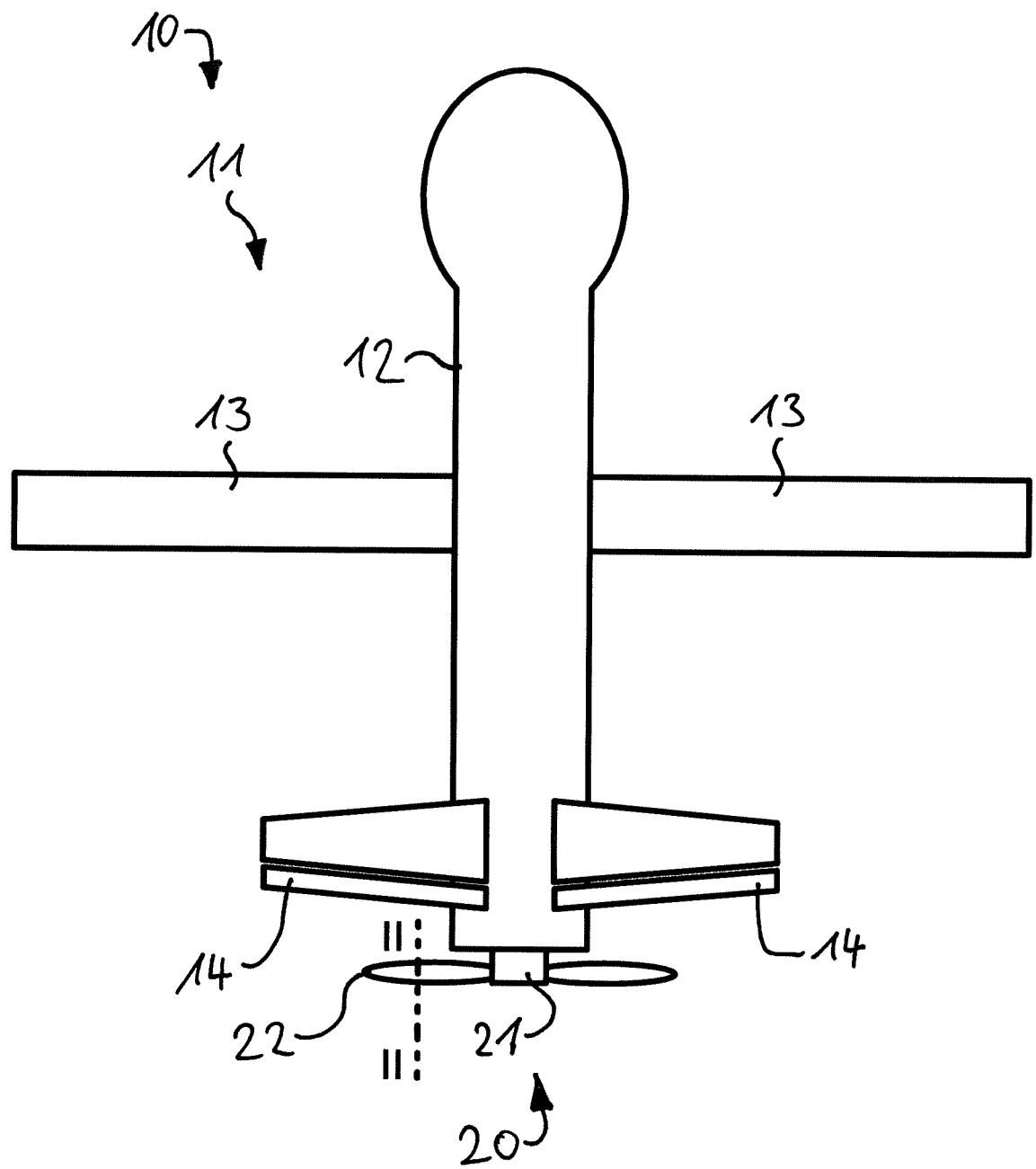
FIG. 1 depicts an embodiment of a UAS according to the invention.

Referring to FIG. 1 an aircraft 10 is depicted. The aircraft 10 is configured as an unmanned aerial system (UAS) 11. The UAS 11 comprises a UAS body 12 to which a pair of wings 13 is attached. The UAS 11 has a plurality of control surfaces 14 that are arranged in manner known per se. The UAS 11 further comprises a propeller 20 for propulsion.

The propeller 20 comprises a hub 21 which supports a plurality of propeller blades 22.

Figure 2:
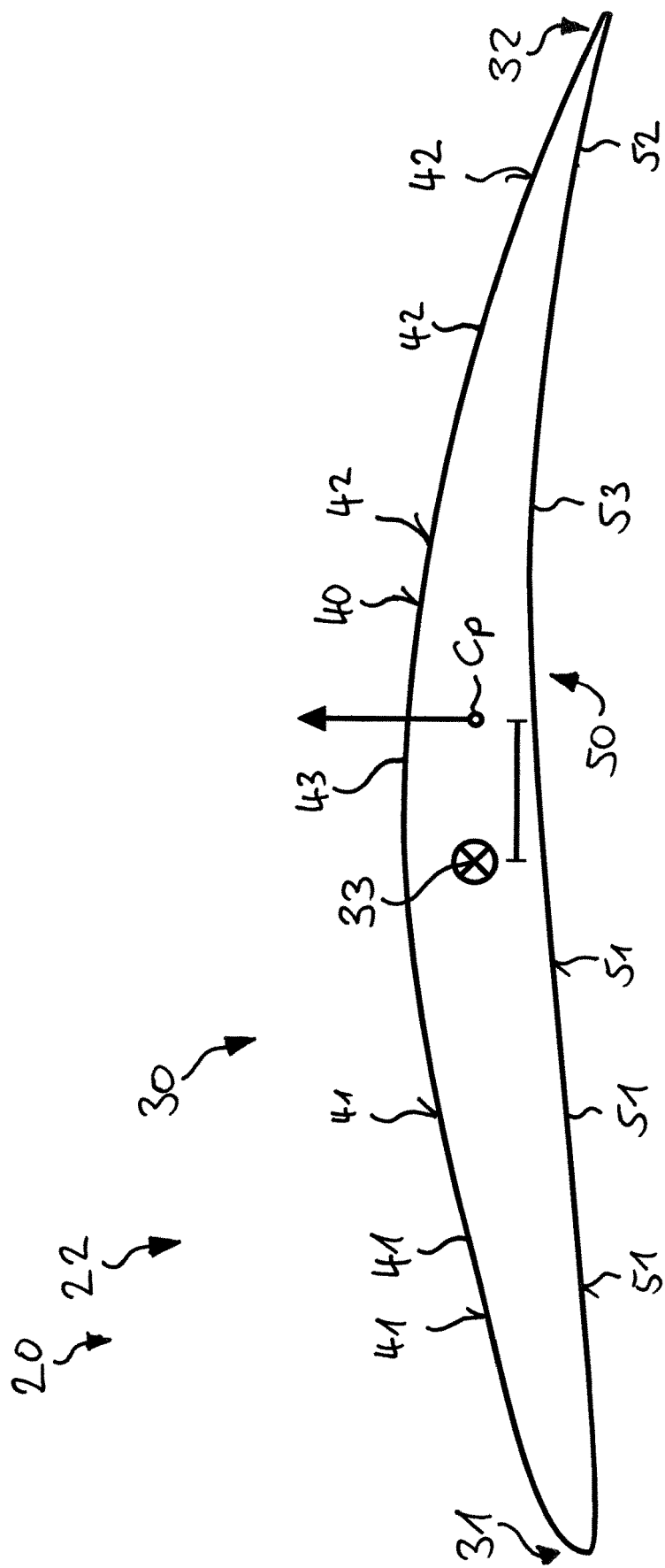
FIG. 2 depicts an embodiment of an airfoil profile according to the invention.

Referring to FIG. 2, the propeller blade 22 has an airfoil profile 30. The airfoil profile 30 corresponds to a cross-section through the propeller blade 22 along plane II-II.

As depicted, the airfoil profile 30 is viewed along a spanwise direction from the tip of the propeller blade 22 towards the root of the propeller blade 22 that is supported by the hub 21. The spanwise direction therefore corresponds to a direction orthogonal to the drawing plane of FIG. 2.

The airfoil profile 30 comprises a leading edge portion 31 and a trailing edge portion 32. The leading edge portion 31 and the trailing edge portion 32 are spaced apart along a chordwise direction. The chordwise direction lies in the drawing plane of FIG. 2. The chordwise direction and the spanwise direction define a vertical direction, that is orthogonal to both the chordwise and the spanwise direction. In other words, the chordwise, spanwise and vertical directions are mutually orthogonal to each other.

The airfoil profile 30 comprises an airfoil centroid 33. The airfoil centroid 33 is also called elastic axis. The airfoil centroid 33 extends in the spanwise direction. The airfoil centroid 33 is influenced by the shape of the airfoil profile 30 which is subsequently described in more detail.

The airfoil profile 30 comprises an upper airfoil surface 40. The upper airfoil surface 40 extends between the leading edge portion 31 and the trailing edge portion 32. The upper airfoil surface 40 is defined by a 6th-order polynomial of the form:

$$y(x)=a_6x^6+a_5x^5+a4x^4+a3x^3+a2x^2+a_1x+a_0; \quad (1)$$

where x corresponds to the percentage of the chord length going from 0% to 100%, and the $a_n$ are coefficients that depend on the thickness of the airfoil profile 30. The result of the polynomial is the distance from 0 along the vertical direction in percent of the chord length. In this embodiment, the thickness varies from 8% close to the tip of the propeller blade 22 to 18% close to the root of the propeller blade 22.

$a_6$ is defined by −0.0078 t²−0.043 t−3.4025;
$a_5$ is defined by 0.0249 t²+0.0917 t+10.762;
$a_4$ is defined by −0.0301 t2−0.0608 t−12.691;
a3 is defined by 0.0165 t2+0.0272 t+6.6256;
a2 is defined by −0.0041 t2−0.0396 t−1.6238;
a1 is defined by 0.0005 t2+0.0232 t+0.332; and
a0 is defined by 0.0009 t+0.0035;
where t is the thickness inserted into the respective equation in percent, e.g., 10% thickness corresponds to t=10.

Preferably, the upper airfoil surface 40 lies within a tolerance band of ±5%, preferably ±3%, more preferably ±1%, most preferably ±0.3% from the polynomial of equation (1).

Figure 3:
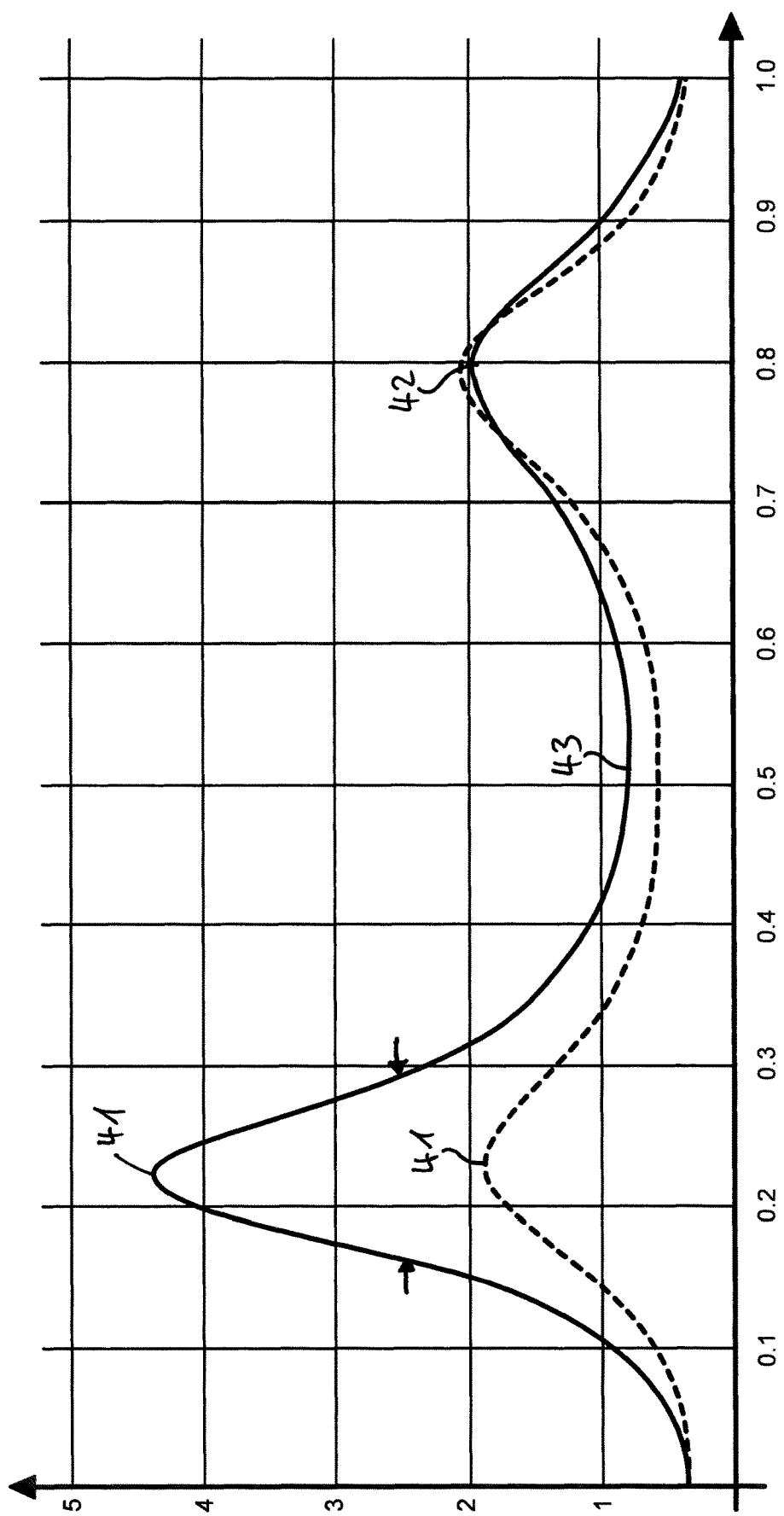
FIG. 3 depicts a diagram of the radius of curvature of an upper airfoil surface.

The radius of curvature ry of the upper airfoil surface 40 is defined in the conventional manner as:

$$r_y = \left| \frac{(1+y'(x)^2)^{3/2}}{y''(x)} \right| \quad (2)$$

where y' and y" are the first and second derivatives of equation (1) with respect to x. FIG. 3 illustrates ry vs. the normalized chord length for t=8% (continuous line) and t=18% (broken line).

The upper airfoil surface 40 comprises a first upper curved portion 41 The first upper curved portion 41 has a maximum modulus of the radius of curvature (see equation (2)) from 1.8 times to 4.4 times of the chord length depending on the thickness. When viewed along the spanwise direction, the maximum modulus of the radius of curvature continuously decreases.

The maximum modulus of the radius of curvature for the first upper curved portion 41 is located between the leading edge portion 31 and the airfoil centroid 33 along the chordwise direction. This maximum is preferably located from 21% to 23% of the chord length.

The first upper curved portion 41 has a spatial extension along the chordwise direction that is measured as the full-width at half-maximum (FWHM) of the radius of curvature. With the previously selected coefficients, the spatial extension of the first upper curved portion 41 along the chordwise direction is in the range of 15 percentage points to 22 percentage points. When viewed along the spanwise direction, the spatial extension of the first upper curved portion 41 continuously increases.

The upper airfoil surface 40 comprises a second upper curved portion 42. The second upper curved portion 42 has a maximum modulus of the radius of curvature (see equation (2)) from 1.9 times to 2.1 times of the chord length depending on the thickness. When viewed along the spanwise direction, the maximum modulus of the radius of curvature continuously increases.

The maximum modulus of the radius of curvature for the second upper curved portion 42 is located between the trailing edge portion 32 and the airfoil centroid 33 along the chordwise direction. This maximum is preferably located from 79% to 80% of the chord length.

The second upper curved portion 42 has a spatial extension along the chordwise direction that is measured as the full-width at half-maximum (FWHM) of the radius of curvature. With the previously selected coefficients, the spatial extension of the second upper curved portion 42 along the chordwise direction is in the range of 19 percentage points to 26 percentage points. When viewed along the spanwise direction, the spatial extension of the second upper curved portion 42 continuously decreases.

The upper airfoil surface 40 comprises a third upper curved portion 43. The third upper curved portion 43 has a minimum modulus of the radius of curvature (see equation (2)) from 0.5 times to 0.8 times of the chord length depending on the thickness. When viewed along the spanwise direction, the minimum modulus of the radius of curvature continuously decreases.

The minimum modulus of the radius of curvature for the third upper curved portion 43 is located between the leading edge portion 31 and the trailing edge portion 32 along the chordwise direction. This minimum is preferably located from 50% to 52% of the chord length.

The third upper curved portion 43 has a spatial extension along the chordwise direction that is measured as the full-width at double-minimum (FWDM) of the radius of curvature. With the previously selected coefficients, the spatial extension of the third upper curved portion 43 along the chordwise direction is in the range of 36 percentage points to 40 percentage points. When viewed along the spanwise direction, the spatial extension of the third upper curved portion 43 continuously decreases.

The airfoil profile 30 comprises a lower airfoil surface 50. The lower airfoil surface 50 extends between the leading edge portion 31 and the trailing edge portion 32. The lower airfoil surface 50 is defined by a 6th-order polynomial of the form:

$$z(x)=b6x6+b5x5+b4x4+b3x3+b2x2+b1x+b0; \quad (3)$$

where x corresponds to the percentage of the chord length going from 0% to 100%, and the bn are coefficients that depend on the thickness of the airfoil profile 30. The result of the polynomial is the distance from 0 along the vertical direction in percent of the chord length. In this embodiment, the thickness varies from 8% close to the tip of the propeller blade 22 to 18% close to the root of the propeller blade 22.

b6 is defined by 0.0021 t2+0.3834 t−2.2564;
b5 is defined by −0.0068 t2−1.1895 t+7.0593;
b4 is defined by 0.0082 t2+1.4243 t−8.3201;
b3 is defined by −0.0042 t2−0.8427 t+4.4385;
b2 is defined by 0.0006 t2+0.2768 t−1.2628;
b1 is defined by −0.0008 t4+0.0439 t3−0.9162 t2+8.3143 t−27.838; and
b0 is defined by −0.00008 t+0.0017;
where t is the thickness inserted into the respective equation in percent, e.g., 10% thickness corresponds to t=10. Preferably, the lower airfoil surface 50 lies within a tolerance band of ±5%, preferably ±3%, more preferably ±1%, most preferably ±0.3% from the polynomial of equation (3).

The radius of curvature rz of the lower airfoil surface 50 is defined in the conventional manner as:

$$r_z = \left| \frac{(1 + z'(x)^2)^{3/2}}{z''(x)} \right| \quad (4)$$

where z' and z" are the first and second derivatives of equation (3) with respect to x. FIG. 4 illustrates rz vs. the normalized chord length for t=8% (continuous line) and t=18% (broken line).

It should be noted that z" has at least one zero at one point along the chord length. For purposes of this disclosure, a portion that has a radius of curvature larger than 10 times the chord length is deemed to be flat.

The lower airfoil surface 50 comprises a first lower flat portion 51. The first lower flat portion 51 exceeds modulus of the radius of curvature (see equation (4)) of 10. The first lower flat portion 51 is located between the leading edge portion 31 and the airfoil centroid 33 along the chordwise direction. The location can be defined by the first zero of z" from the leading edge portion 31, i.e. the zero closest to the leading edge portion 31. The zero is preferably located from 25% to 30% of the chord length, more preferably from 25% to 29% of the chord length, more preferably from 25.5% to 28.8% of the chord length.

The first lower flat portion 51 has a spatial extension along the chordwise direction that is measured as the full-width at a radius of curvature of 10 (FW@R10). With the previously selected coefficients, the spatial extension of the first lower flat portion 51 along the chordwise direction is in the range of 8 percentage points to 30 percentage points. When viewed along the spanwise direction, the spatial extension of the first lower flat portion 51 continuously increases.

The lower airfoil surface 50 comprises a second lower flat portion 52. The second lower flat portion 52 exceeds modulus of the radius of curvature (see equation (4)) of 10. The second lower flat portion 52 is located between the leading edge portion 31 and the trailing edge portion 32 along the chordwise direction. The location can be defined by the last zero of z" from the leading edge portion 31, i.e. the zero closest to the trailing edge portion 32. The zero is preferably located from 36% to 52% of the chord length.

The second lower flat portion 52 has a spatial extension along the chordwise direction that is measured as the full-width at a radius of curvature of 10 (FW@R10). With the previously selected coefficients, the spatial extension of the second lower flat portion 52 along the chordwise direction is in the range of 1 percentage points to 3 percentage points. When viewed along the spanwise direction, the spatial extension of the second lower flat portion 52 continuously decreases.

The lower airfoil surface 50 comprises a lower curved portion 53. The lower curved portion 53 has a minimum modulus of the radius of curvature (see equation (4)) from 0.85 times to 1.35 times of the chord length depending on the thickness. When viewed along the spanwise direction, the minimum modulus of the radius of curvature continuously decreases.

The minimum modulus of the radius of curvature for the lower curved portion 53 is located between the trailing edge portion 32 and the airfoil centroid 33 along the chordwise direction. This minimum is preferably located from 75% to 79% of the chord length, more preferably from 77% to 78% of the chord length.

The lower curved portion 53 has a spatial extension along the chordwise direction that is measured as the full-width at double-minimum (FWDM) of the radius of curvature. With the previously selected coefficients, the spatial extension of the lower curved portion 53 along the chordwise direction is in the range of 23 percentage points to 45 percentage points. When viewed along the spanwise direction, the spatial extension of the lower curved portion 53 continuously decreases.

In order to reduce noise, the invention proposes an airfoil profile (30) for an aircraft (10), such as an unmanned aerial system (11). The airfoil profile (30) comprises a leading edge portion (31) and a trailing edge portion (32) that are spaced apart along a chordwise direction, an airfoil centroid (33); and an upper airfoil surface (40) and a lower airfoil surface (50). The airfoil surfaces (40, 50) are shaped such that the pressure center (Cp) of the lifting force is arranged at the same chord location as the airfoil centroid (33) or closer to the trailing edge portion (32) along the chordwise direction than the airfoil centroid (33). With this, a pitch-down momentum is generated that urges the leading edge portion (31) towards a lower angle of attack (AoA).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 aircraft
11 unmanned aerial system (UAS)
12 UAS body
13 wing
14 control surface
20 propeller
21 hub
22 propeller blade
30 airfoil profile
31 leading edge portion
32 trailing edge portion
33 airfoil centroid
40 upper airfoil surface
41 first upper curved portion
42 second upper curved portion
43 third upper curved portion
50 lower airfoil surface
51 first lower flat portion
52 second lower flat portion
53 lower curved portion
Cp pressure center

The invention claimed is:

1. A propeller blade for an aircraft comprising an airfoil profile, the airfoil profile being configured for reducing a noise level, the airfoil profile comprising:

a leading edge portion and a trailing edge portion that are spaced apart along a chordwise direction;
an elastic axis that is arranged from 40% to 60% of a chord length along the chordwise direction; and
an upper airfoil surface and a lower airfoil surface that are shaped so as to generate a lifting force in a manner such that a pressure center of the lifting force is arranged at the same chord location as the elastic axis or closer to the trailing edge portion along the chordwise direction than the elastic axis;
wherein the upper airfoil surface is defined by a first 6th-order polynomial defined by:

$y(x) = a_6x^6 + a_5x^5 + a_4x^4 + a_3x^3 + a_2x^2 + a_1x + a_0$, where:

$a_6$ is defined by $-0.0078t^2 - 0.043t - 3.4025$;
$a_5$ is defined by $0.0249t^2 + 0.0917t + 10.762$;
$a_4$ is defined by $-0.0301t^2 - 0.0608t - 12.691$;
$a_3$ is defined by $0.0165t^2 + 0.0272t + 6.6256$;
$a_2$ is defined by $-0.0041t^2 - 0.0396t - 1.6238$;
$a_1$ is defined by $0.0005t^2 + 0.0232t + 0.332$; and
$a_0$ is defined by $0.0009t + 0.0035$;
and wherein the upper airfoil surface lies within a first tolerance band of +/−5% from the first 6th-order polynomial y(x); and
wherein the lower airfoil surface is defined by a second 6th-order polynomial defined by:

$z(x) = b_6x^6 + b_5x^5 + b_4x^4 + b_3x^3 + b_2x^2 + b_1x + b_0$, where:

$b_6$ is defined by $0.0021t^2 + 0.3834t - 2.2564$;
$b_5$ is defined by $-0.0068t^2 - 1.1895t + 7.0593$;
$b_4$ is defined by $0.0082t^2 + 1.4243t - 8.3201$;
$b_3$ is defined by $-0.0042t^2 - 0.8427t + 4.4385$;
$b_2$ is defined by $0.0006t^2 + 0.2768t - 1.2628$;
$b_1$ is defined by $-0.0008t^4 + 0.0439t^3 - 0.9162t^2 + 8.3143t - 27.838$; and
$b_0$ is defined by $-0.00008t + 0.0017$;
and wherein the lower airfoil surface lies within a second tolerance band of +/−5% from the second 6th-order polynomial z(x);
where x corresponds to a percentage of the chord length from 0% to 100%, t is a thickness of the airfoil profile inserted into the respective equation in percent, wherein a result of the first and second 6th-order polynomials is a distance from 0 along a vertical direction in percent of the chord length, and wherein the thickness varies from 8% near a tip of the propeller blade to 18% near a root of the propeller blade opposite the tip.

2. The propeller blade according to claim 1, wherein the elastic axis is arranged from 43% to 55% of the chord length along the chordwise direction.

3. The propeller blade according to claim 1, wherein the upper and lower airfoil surface are shaped such that the pressure center of the lifting force is arranged from 40% to 60% of the chord length along the chordwise direction.

4. The propeller blade according to claim 1, wherein the upper airfoil surface comprises a first upper curved portion that is arranged between the leading edge portion and the elastic axis along the chordwise direction.

5. The propeller blade according to claim 4, wherein the first upper curved portion has a maximum modulus of a radius of curvature from 1.8 times to 4.4 times the chord length.

6. The propeller blade according to claim 1, wherein the upper airfoil surface comprises a second upper curved portion that is arranged between the elastic axis and the trailing edge portion along the chordwise direction.

7. The propeller blade according to claim 6, wherein the second upper curved portion has a maximum modulus of a radius of curvature from 1.9 times to 2.1 times the chord length.

8. The propeller blade according to claim 1, wherein the upper airfoil surface comprises a third upper curved portion that is arranged between the leading edge portion and the trailing edge portion along the chordwise direction.

9. The propeller blade according to claim 1, wherein a third upper curved portion has a minimum modulus of a radius of curvature from 0.5 times to 0.8 times the chord length.

10. The propeller blade according to claim 1, wherein the lower airfoil surface comprises a first lower flat portion that is arranged between the leading edge portion and the elastic axis along the chordwise direction.

11. The propeller blade according to claim 1, wherein the lower airfoil surface comprises a second lower flat portion that is arranged between the leading edge portion and the trailing edge portion along the chordwise direction.

12. The propeller blade according to claim 1, wherein the lower airfoil surface comprises a lower curved portion that is arranged between the elastic axis and the trailing edge portion along the chordwise direction.

13. A propeller for an aircraft comprising a hub and at least one propeller blade according to claim 1 that is supported by the hub.

14. An aircraft comprising the propeller blade according to claim 1.

15. An aircraft, according to claim 14, wherein the aircraft is an unmanned aerial system.

16. An aircraft, comprising a propeller according to claim 13.

17. An aircraft, according to claim 16, wherein the aircraft is an unmanned aerial system.

* * * * *